Dec. 26, 1950 W. S. KIMBALL 2,535,683
BABY CARRIER
Filed April 22, 1947
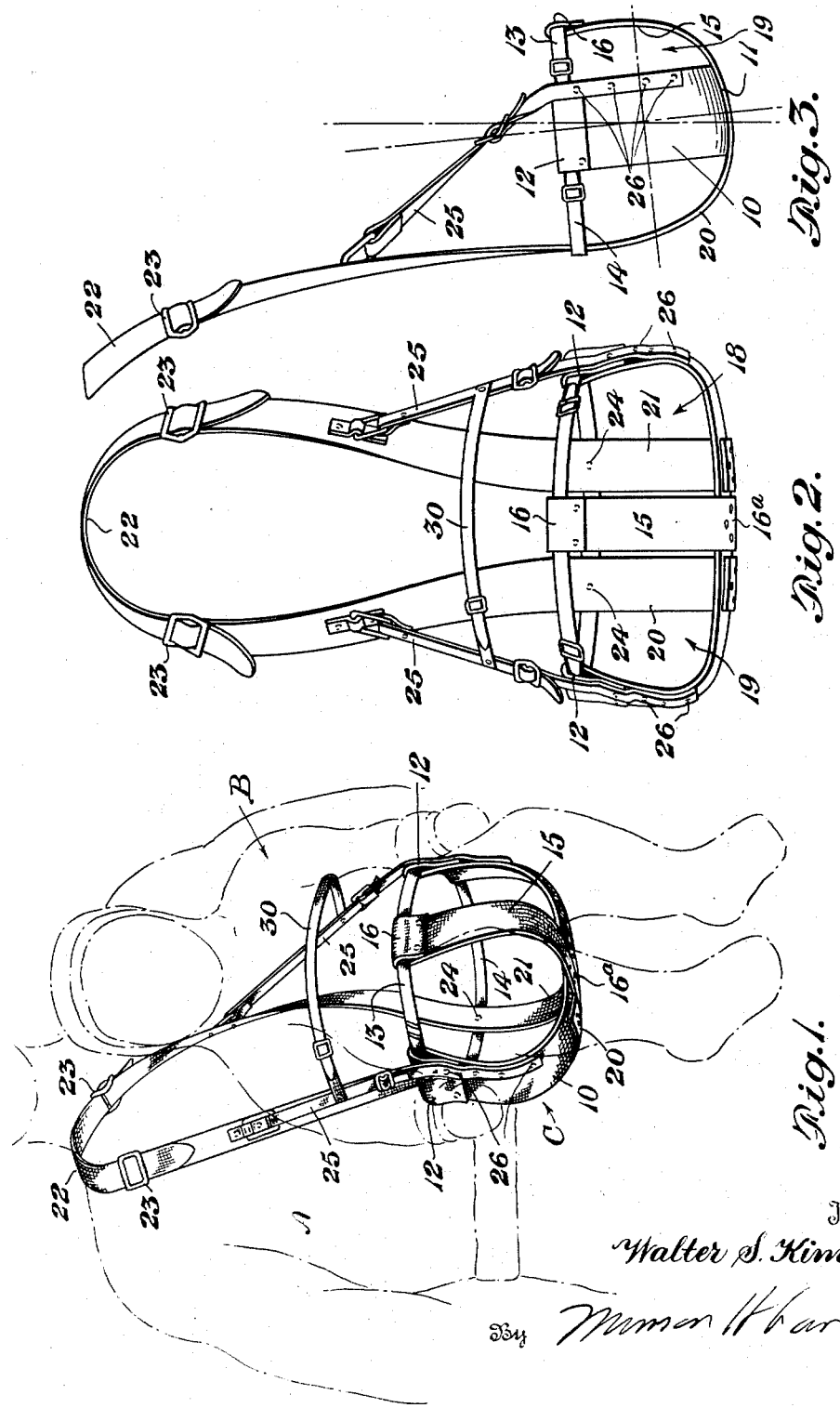
Inventor
Walter S. Kimball,
By Numan H Hare
Attorney Patented Dec. 26, 1950

2,535,683

UNITED STATES PATENT OFFICE 2,535,683

BABY CARRIER

Walter S. Kimball, Fort Warren, Wyo.

Application April 22, 1947, Serial No. 743,029

2 Claims. (Cl. 224—6)

This invention relates to improvements in baby carriers of the type in which the carrier is adapted for attachment to the person carrying the child.

Among the objects of the invention are to provide a carrier which is comfortable and convenient to both the child and the carrier person.

Another object of the invention is to insure the safety of the child.

A further object is to provide a carrier which is simple and inexpensive to manufacture.

Still another object of the invention is to provide a carrier in which the child faces away from the person carrying with the seat portion of the carrier tilted slightly upwardly and forwardly so that the child's body will be tilted slightly rearwardly to rest against the carrier person, thus reducing the strain on the carrier straps which extend over the shoulders of the carrier person and avoiding any tendency of the child to tilt forwardly and fall from the carrier.

The present device has been used in carrying a baby when the carrier person has been engaged in such strenuous activities as skiing and working at a machine without inconvenience either to the carrier person or the child.

The invention will be more readily understood by reference to the accompanying drawings and the following detailed description, in which are set forth illustrative embodiments of the inventive thought.

In the drawings:

Fig. 1 is a perspective view illustrating the carrier in use with the baby facing away from the carrier person;

Fig. 2 is a front view of the carrier shown on a somewhat larger scale than in Fig. 1; and Fig. 3 is a side view of the carrier illustrating the manner in which the seat portion of the carrier is supported and tilted upwardly and forwardly.

Referring to the drawings, and particularly to Fig. 1 thereof, A indicates a carrier person, B the child to be carried and C the carrier which is the subject of the present invention.

As will be observed from the drawing the carrier has an adjustable strap fitting over the shoulders of the carrier person which is adapted to support the child facing away from the carrier person with the carrier seat tilted upwardly and forwardly, thus causing the body of the child to tilt rearwardly so that its back rests against the body of the carrier person, with the head of the child at about a level with the shoulder of the carrier person, in a position to be supported thereby while at the same time the vision of the child is not obstructed and its arms are under no strain.

Referring more in detail to the carrier C, which is the subject of the present invention, this includes a broad transverse seat portion or band 10 preferably of strong, flexible material, such as woven belting material or the like, similar to what is used in the carrier packs, belting, cartridge carriers and the like by the army. The seat band provides the principal support for the weight of the child and is wide enough to avoid discomfort. As shown in Figs. 1 and 3, the bottom portion 11 of the band is tilted upwardly and forwardly when the carrier is in position on the carrier person.

The ends of the carrier band are provided with loops 12, 12 at the ends, into which extend front and rear straps 13 and 14, each of which may be adjustable if desired. The front and rear straps 13 and 14, which may be relatively narrow, are not ordinarily relied upon either to retain the child in position or to support its weight, but serve primarily as means for attaching other parts of the carrier. The straps 13 and 14 together comprise a waist strap.

As shown, a saddle strap 15 is provided with a loop 16, through which the front strap 13 passes, so that the upper end of the saddle strap may be adjustably supported by the front strap 13, the lower end of the saddle strap being secured at 16 and the lower surface 11 of the seat band 10 about midway between the ends of the seat band. The child's legs are adapted to extend through openings 18 and 19 formed between the front of the seat and the saddle strap. Owing to the upward and forward tilt of the seat band, however, the body of the child does not normally contact the saddle strap.

To the rear of the seat strap 10 are attached lower ends 20 and 21 of main supporting strap 22, which strap extends over the shoulders of the carrier person and may be provided with suitable adjusting buckles 23, 23. The lower portions 20 and 21 of the main strap are close enough together to provide a comfortable support for the buttocks of the child and are preferably attached at 24, 24 to the rear strap 14.

A characteristic feature of the present invention in combination with the wide seat strap is the use of lifting straps 25, 25 which extend from the upper portions of the carrier strap to the ends of the seat strap 10, these lifting straps being secured along the front edges of the ends of said strap for considerable lengths, as indicated at 26, thus insuring a firm support and providing for the forward tilting of the seat band, which is a characteristic of the present invention. These lifting straps are preferably adjustable so as to provide for the desired degree of tilt.

A chest strap 30 may be provided connecting the two lifting straps and intended to prevent the child from tilting forwardly. The chest strap 30 may be adjustable if desired.

The invention has been described in detail for the purpose of illustration, but it will be obvious that numerous modifications and variations may be resorted to without departing from the spirit of the invention.

I claim:

1. A baby carrier comprising a wide transverse seat strap, a main supporting strap adapted to extend over the shoulders of a carrier person, having wide buttock supporting portions at its lower ends secured to the rear of said seat strap, lifting straps extending from the upper portions of said main strap forwardly to the ends of said seat strap, said lifting straps having extensions secured along the front edges of the ends of the seat strap and being of a length to tilt the front edge of the seat strap forwardly whereby the body of a child carried by said carrier is tilted rearwardly so that its back rests against the body of the carrier person, said carrier including a waist strap connecting the ends of the seat strap, a saddle strap connected at one end to the center of the front portion of said waist strap, and at its other to the center of the seat strap and providing leg openings between the saddle strap and the seat strap for a child seated in said carrier and facing forwardly from the carrier person, and a chest strap connecting said lifting straps intermediate their points of attachment to the main strap and to the seat strap.

2. A baby carrier comprising a wide transverse seat strap, a main supporting strap adapted to extend over the shoulders of a carrier person, having wide buttock supporting portions at its lower ends secured to the rear of said seat strap, lifting straps extending from the upper portions of said main strap forwardly to the ends of said seat strap, said lifting straps having extensions secured along the front edges of the ends of the seat strap and being of a length to tilt the front edge of the seat strap forwardly whereby the body of a child carried by said carrier is tilted rearwardly so that its back rests against the body of the carrier person, said carrier including a waist strap connecting the ends of the seat strap, and a saddle strap connected at one end to the center of the front portion of said waist strap and at its other to the center of the seat strap and providing leg openings between the saddle strap and the seat strap for a child seated in said carrier and facing forwardly from the carrier person, the buttock supporting portions of the main strap being connected to the waist strap at the rear portion thereof.

WALTER S. KIMBALL.

REFERENCES CITED

The following references are of record in the file of this patent:

UNITED STATES PATENTS

| Number | Name | Date |
|---|---|---|
| 1,082,017 | Feinen | Dec. 23, 1913 |
| 1,109,065 | Heath et al. | Sept. 1, 1914 |
| 1,196,003 | Lippincott | Aug. 29, 1916 |
| 1,498,593 | Waiss | June 24, 1924 |
| 2,056,925 | Kimbrough | Oct. 6, 1936 |
| 2,468,588 | Clemens, Jr. | Apr. 26, 1949 |

FOREIGN PATENTS

| Number | Country | Date |
|---|---|---|
| 10,749 | Great Britain | May 8, 1907 |
| 221,416 | Great Britain | Sept. 11, 1924 |